Sept. 28, 1943.      R. W. SMITH      2,330,390
SERVICE TERMINATOR
Filed Feb. 23, 1940      5 Sheets-Sheet 1
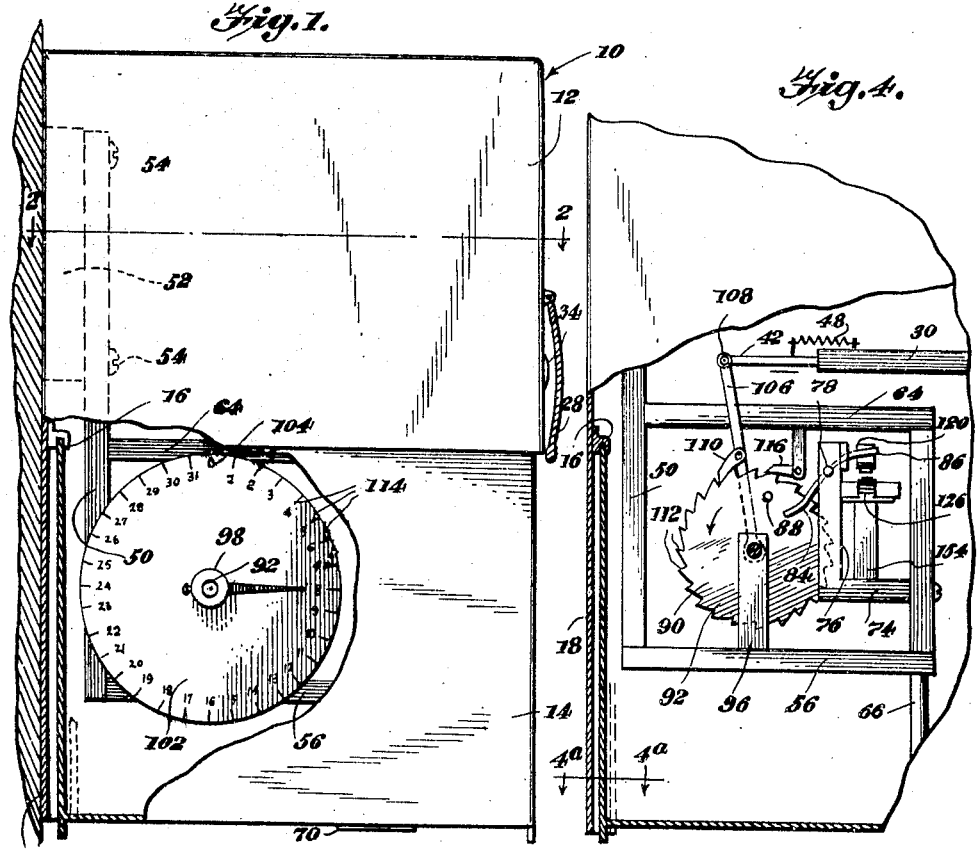
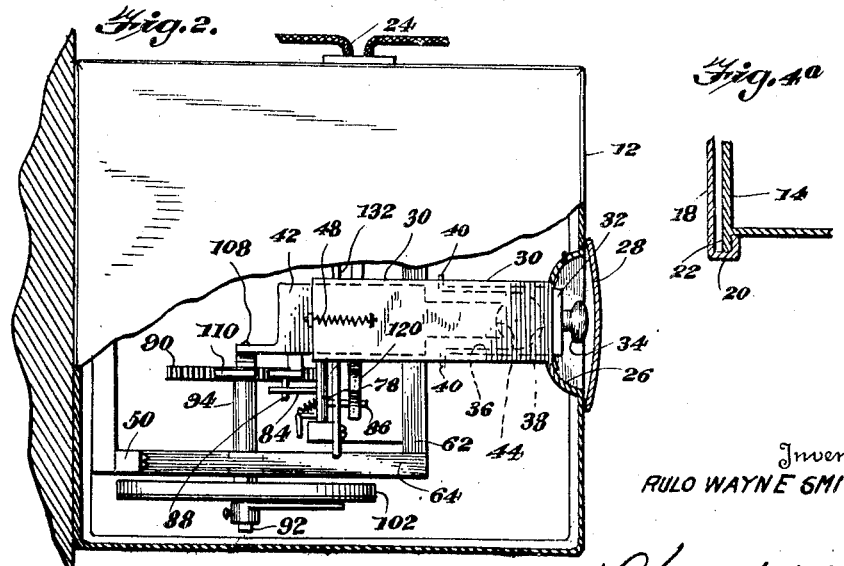
Inventor
RULO WAYNE SMITH Sept. 28, 1943.  R. W. SMITH  2,330,390
SERVICE TERMINATOR
Filed Feb. 23, 1940  5 Sheets-Sheet 2
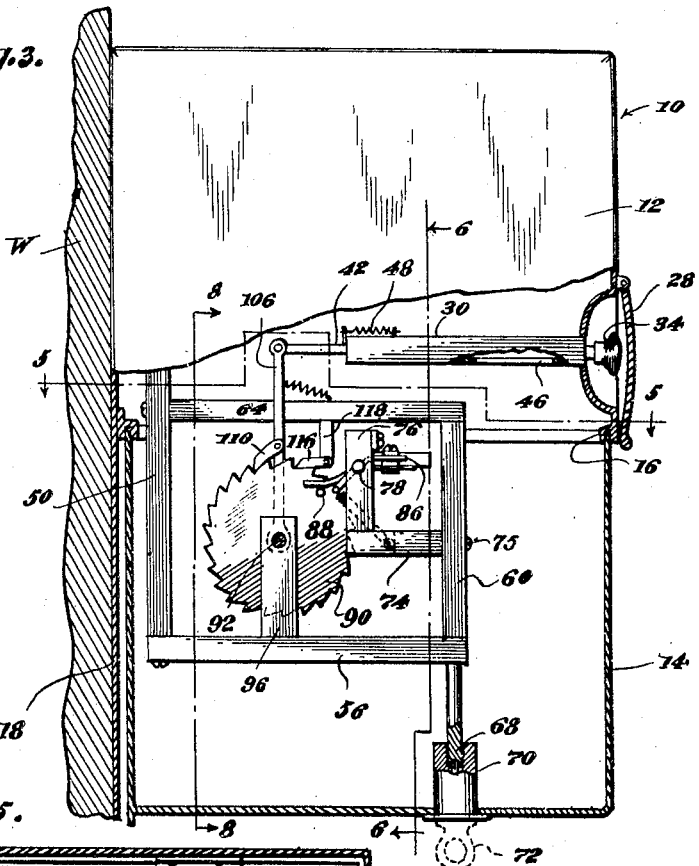
Inventor
RULO WAYNE SMITH

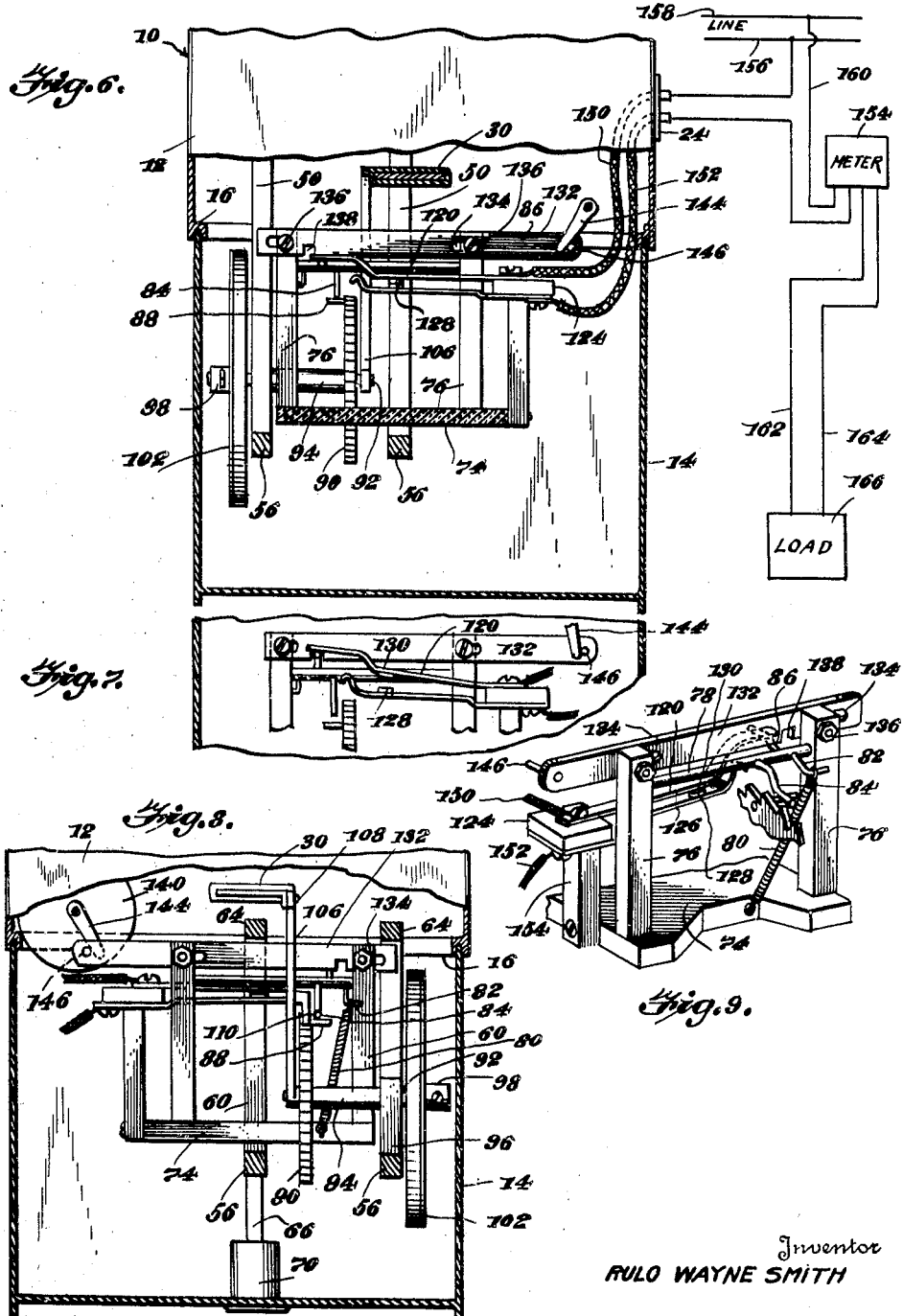

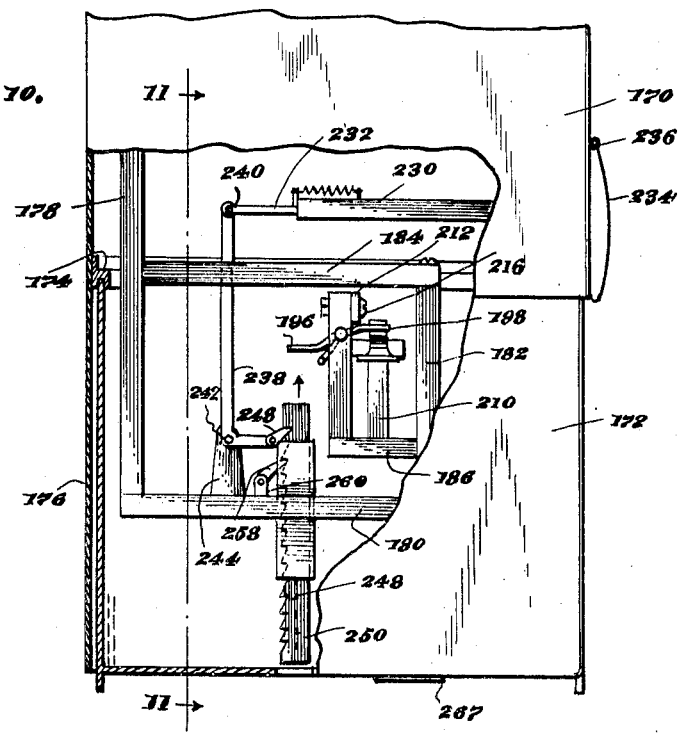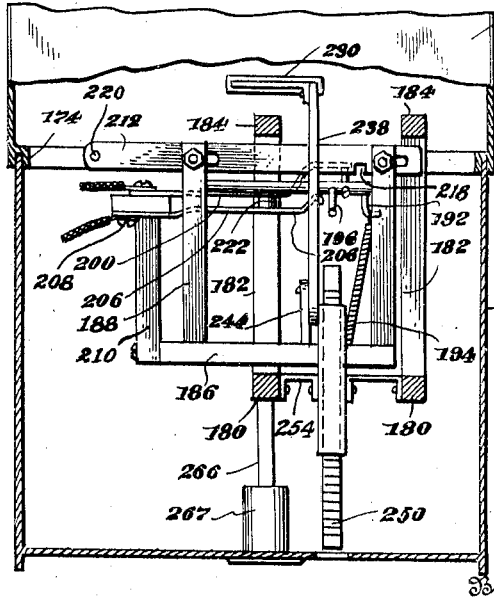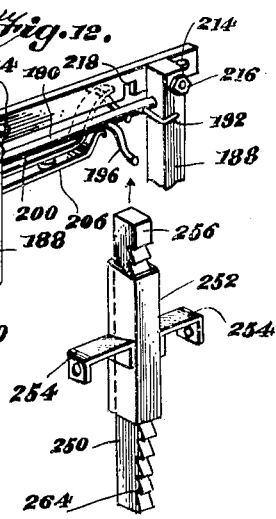

Sept. 28, 1943.　　　R. W. SMITH　　　2,330,390
SERVICE TERMINATOR
Filed Feb. 23, 1940　　　5 Sheets-Sheet 5
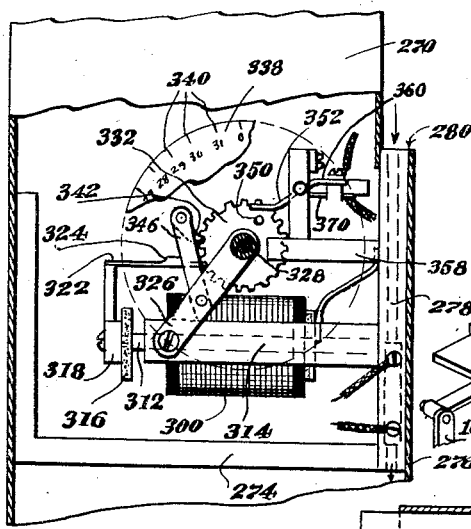
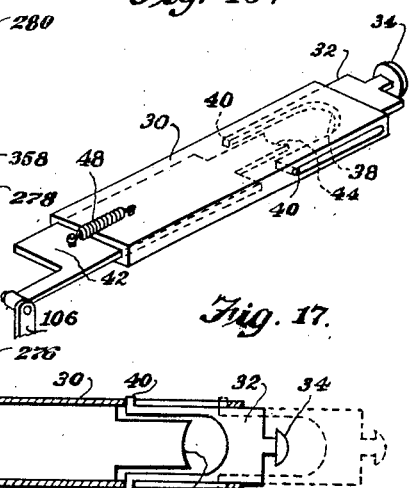
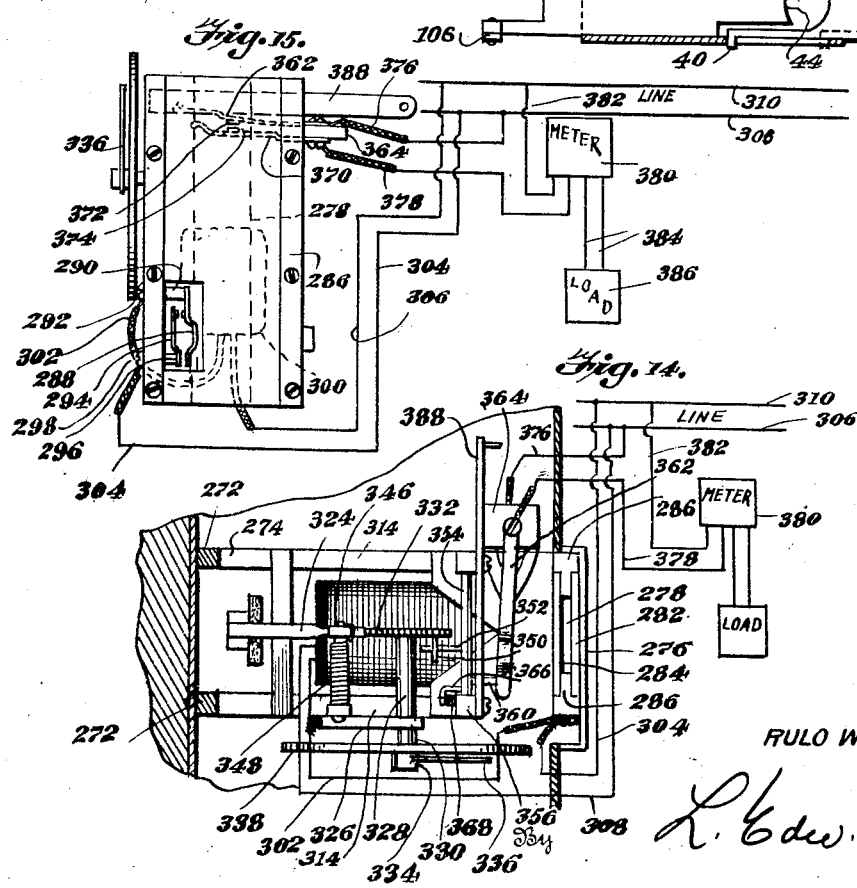
Inventor
RULO WAYNE SMITH Patented Sept. 28, 1943

2,330,390

UNITED STATES PATENT OFFICE 2,330,390

SERVICE TERMINATOR

Rulo Wayne Smith, Auburn, Ind.

Application February 23, 1940, Serial No. 320,498

3 Claims. (Cl. 194—9)

This invention relates to meter service terminators.

The primary purpose of the invention is to provide a device capable of being used in combination with water, gas or electric meters which will discontinue or interrupt the meter service upon the non-payment of the gas, water or electric service charge.

A further object of the invention is to provide a supply cut-off in combination with a metering system having a clock controlled means for disrupting the service unless the prescribed service charge is paid within a predetermined time lapse.

A still further object of the invention is to provide a clock and coin controlled switch mechanism capable of operation as a unit to terminate the supply service and to provide means for the collector of the water, gas or electric service charge to set the service terminator to disrupt the supply upon non-payment of the service charge after a predetermined number of elapsed hours from the time of the presentation of the bill.

One of the major problems that has presented itself to public utility corporations is the control of their delinquent accounts. This situation is rendered particularly acute in that the public service company does not know to what extent the subscriber is indebted nor does the subscriber know the amount of the service charge for a period of time until the rendition of the usual monthly bill. Inasmuch as utility companies usually extend an additional 15 or 30 day grace period before the subscriber is classed as a delinquent, the subscriber has consumed nearly another month's service before the utility company can ascertain whether the original month's service charge is to terminate in a delinquency.

The above practice is objectionable and is overcome by providing a service terminator having a coin and time controlled switch mechanism which may be pre-set by the utility collector to cut off the supply at a predetermined time unless the exact amount of the service charge is deposited within the terminator.

Other objects and advantages of the invention will become apparent during the course of the following description of the accompanying drawings, wherein:

Figure 1 is a side elevational view of a preferred embodiment of the invention, showing the manually set pointer for determining the number of a single denomination coin required to prevent interruption of the service supply, Figure 2 is a horizontal cross sectional view taken on line 2—2 of Figure 1, looking in the direction of the arrows, illustrating the coin control device, Figure 3 is a side elevational view, partly broken away to show the coin controlled switch mechanism in its neutral position, Figure 4 is a side elevational view similar to Figure 3, illustrating the coin controlled switch mechanism in operation, Figure 4a is a horizontal cross-sectional view taken on line 4a—4a of Figure 4, looking in the direction of the arrows, illustrating in detail, the manner of slidably connecting the removable casing to the mechanism housing, Figure 5 is a horizontal cross-sectional view taken on line 5—5 of Figure 3, looking in the direction of the arrows, showing the time operated trip mechanism, Figure 6 is a vertical cross-sectional view taken on line 6—6 of Figure 3, looking in the direction of the arrows illustrating in detail the coin operated step-by-step ratchet mechanism, Figure 7 is a similar view showing the switch in an open position after being tripped by the time controlled slide, Figure 8 is a vertical cross-sectional view taken on line 8—8 of Figure 3 illustrating the time controlled trip and its associated parts, Figure 9 is a perspective view of switch mechanism, illustrating the latch trip and the step-by-step delaying mechanism, Figure 10 is a side elevational view of a modified form of the invention showing a portion of the casing broken away to disclose the operating parts, Figure 11 is a vertical cross sectional view taken on line 11—11 of Figure 10, further disclosing the coin controlled step-by-step operating mechanism, Figure 12 is a detailed perspective view of switch mechanism and the modified ratchet coin operator, Figure 13 is a side elevational view of a further modified form of the invention employing a solenoid operated coin mechanism, Figure 14 is a horizontal, fragmentary cross-sectional view showing the circuit wiring and operating instrumentalities of the form of the invention shown in Figure 13, and Figure 15 is a front elevational view of the operating mechanism shown removed from the casing.

Figs. 16 and 17 are perspective and sectional views, respectively, of the coin slide.

In the drawings, wherein for the purpose of illustrating the invention and wherein like reference characters will be employed to designate like parts throughout the same, in Figures 1 to 9, inclusive, the reference character 10 will be employed to generally designate a housing including an upper section 12 capable of being supported on a wall W adjacent the service meter and a removable bottom section 14. The lower portion of the housing section 12 is open and is provided with a grooved edge 16 for receiving the upper edge of the housing section 14. An extension 18 is formed on one wall of the upper section 12 and has its vertical edges 20 overturned for receiving oppositely extending flanges 22 on one of the walls of the lower casing section 14. A ferrule bushing 24 is formed in one wall of the casing section 12 for admitting electric cables and the front wall is provided with a concave cupped portion 26 having a hinged cover lid 28 for protecting the operating knob of a coin mechanism plunger which will be more fully hereinafter described.

Extending inwardly from the cupped portion 26 is a squared tube 30 having reciprocably mounted therein, a sliding plunger 32 on the outer end of which is provided a knob 34. The plunger 32 is formed with a slot 36, curved at the closed end, as at 38, and having oppositely directed lugs 40 riding in elongated slots formed in the side walls of the squared coin tube 30.

A coin of a certain denomination may be inserted in the rounded portion of the slot 36, as at 38, when the plunger 32 is withdrawn beyond the cup shaped cavity 26 and the plunger may then be moved inwardly until the edge of the coin engages a sliding bar 42 also reciprocably mounted in the squared tube 30. The inner end of the sliding bar 42 is provided with a cut-away portion 44 for being engaged by the coin to connect the plunger 32 to the operating slide bar 42 and impart sliding motion thereto. Continued movement of the plunger 32 will move the inserted connecting coin or slug to a position above the opening 46 in the squared tube 30 so that the same will be released and drop into the lower section 14 of the casing housing. A coil spring 48 is connected to the sliding operating bar 42 and the squared tubular casing 30 to return the plunger and operating bar to a neutral position.

The above coin lock is intended to be employed for controlling the instrumentalities within the housing 10 which include a supporting chassis comprising vertical side bars 50, the upper ends of which are supported by a block 52 secured in place by screws 54 extending through the vertical bars 50 and anchored in the block 52. Secured to the lower end of the bars is a pair of parallel bars 56 connected at their outer ends by a horizontal bar 58. Also extending upwardly from the horizontal bar 58 is a pair of bars 60 connected at the top by a bar 62. Parallel side bars 64 connect the vertical chassis bars 60 to the vertical suspension bars 50.

Secured to one of the lowermost chassis bars 56 is a downwardly extending rod 66, having the extreme free end threaded, as at 68, for receiving a lock 70 carried by the bottom wall of the lower casing section 14. A key 72 may be employed for operating the lock 70 to release the lower casing section 14 so that it may be removed for inspecting the parts of the terminator, collecting coins and setting the terminator at meter reading times.

Bolted to the chassis frame above described is a platform 74, as at 75, and said platform comprises a pair of vertical standards 76 between which extends a rock shaft 78. At one end of the rock shaft, there is provided a coil spring 80 having one end connected to the platform and the opposite end connected to a lever arm 82 secured to the rock shaft.

Also secured to the rock shaft 78 are oppositely extending arms 84 and 86 and the arm 84 is bent angularly on its free end for engagement with a trip pin 88 carried on a ratchet wheel 90.

The ratchet wheel 90 is rigidly secured to one end of an arbor 92 which is journaled in a tubular extension 94 supported by a vertical standard 96 carried by the chassis bar 56.

Mounted on the arbor 92 is a collar 98 having a pointer 100 adapted to cooperate with a stationary dial 102 secured to the chassis frame bar 64 by means of a screw 104. Also mounted on the arbor 92 at the opposite end thereof is a rock lever 106, the upper end of which is connected to the reciprocating slide bar 42 by a pivot pin 108. Intermediate the ends of the rock lever 106 is a pivoted pawl 110 adapted to engage teeth 112 formed on the periphery of the ratchet wheel 90 to cause the wheel to revolve one notch upon rocking movement of the rock lever 106.

Graduations 114 on the dial 102 are marked in accordance with the number of notches formed in the ratchet wheel, so that the pointer 100 may be set at one of the graduations and the rock lever will be rocked a corresponding number of times before returning the pointer 100 to zero which will position the trip pin 88 in such a position to engage the rock shaft arm 84. A pivoted pawl 116 has one end presented to the ratchet teeth 112 and the opposite end is pivotally carried by a suspended support 118 mounted on the chassis bar 64.

It will be understood that when the rock lever is moved by the slide bar 32 to advance the ratchet wheel one notch, a coin will be required for effecting each advancement and when the trip pin 88 engages the rock arm 84, the rock arm 86 will move downwardly and will move away from a contact arm 120 which has its other end anchored, as at 122, to an insulating block 124. Also carried by the insulating block 124 is a stationary contact member 126 on the end of which is provided a contact 128 adapted to engage a contact 130 carried by the free movable end of the contact lever 120. In Figure 6, the rock arm 86 is shown in a position to hold the contact points closed, while in Figure 7 the contact points are shown separated. Since the movable contact arm 120 is normally urged downwardly the rocking movement applied to the rock shaft 78 by the rock arm 84 engaging the trip pin 88 will allow the contacts to close and the trip pin 88 is in this position after the coin operated mechanism has shifted the ratchet wheel 90 by the insertion of a series of coins to advance the pointer from one of the set graduations on the dial 102 to zero. If the trip pin 88 is out of engagement with the rock arm 84, the rock arm 86 will be moved upwardly under the tension of the spring 80, thereby separating the contacts 128 and 130, and breaking the circuit therethrough.

Slidably mounted upon the extreme upper ends of the vertical standards 76 is a slide bar 132 having elongated slots 134 for receiving bolts 136. The slide bar 132 is directly above the rock arm 86 and is adapted to hold the rock arm in a lowermost position when the slide bar 132 is at the end of one of its sliding positions. A notch 138 is formed in the slide bar and is adapted to receive the rock arm 86 when the slide bar is in its opposite extreme position to allow the rock arm 86 to move upwardly when the rock arm 84 is disengaged from the trip pin 88, thereby allowing the contact arm 120 to move upwardly and separate the contacts 128 and 130.

Means is provided for shifting the slide bar in timed relation and includes a clock mechanism 140 carried by the inner wall of the upper casing section 12, having an alarm arbor 142 provided with a crank arm 144 adapted to have its free end engage a pin 146 carried on one of the free ends of the slide bar 132.

It will thus be seen, that when the pointer 100 has been set to one of the graduations 114, as for instance 8, shown in Figure 1, that it will be necessary to insert 8 coins to operate the slide bar 42 and advance the ratchet wheel 90 so that the trip pin 88 will be moved to engage the rock arm 84 when the pointer has moved to the zero mark on the graduated scale. In this position the contacts will be maintained closed irrespective of the position of the slide bar 132. However, should the coins not be inserted after the device has been set by the inspector or collector, the slide bar 132 will shift after a predetermined time limit thereby allowing the rock arm 86 to move upwardly in the notch 138. When the rock arm 86 is moved upwardly, the contacts 128 and 132 are separated thereby breaking the circuit through cables 150 and 152 connected to the contact arms 120 and 126, respectively, on opposite sides of the insulator block 124. A post 154 has one of its ends secured to the platform 74 while the upper end supports the insulating block 124.

The terminator device can be used for closing a circuit through a solenoid operated valve to cause the valve to cut off the supply of gas or water entering a building for any purpose. However, the cables 150 and 152 are connected in series with an electric meter 154 and the cable 150 is attached to one of the current supply lines 156 while the cable 152 is attached to the meter 154. The other side of the supply line 158 is connected to the meter by a lead line 160. Lead lines 162 and 164 connect with the meter 154 for supplying current to various electric appliances such as electric lights etc. representing a load 166.

For a consideration of the operation of the device, it will be supposed that the inspector of the utility company calls to read the meter 154. If he finds that the subscriber has used two dollars worth of current, the inspector is instructed to insert 8 coins which will total the amount of the bill. The inspector of the utility company will set the pointer 100 to one of the graduations on the dial 102 in accordance with the number of coins totaling the cost of the current consumed. The slide clock arm 132 will be set so that the rock arm 86 is out of alignment with the notch 138 therein. If the coins are not inserted to advance the ratchet wheel so that the trip pin 88 is brought under the rock arm 84, the clock mechanism will operate the slide bar 132 after a predetermined number of hours thereby moving the notch therein directly above the rock arm 86 and allowing the same to shift upwardly engaging the movable contact arm 120 and separating the contacts 128 and 130. After the contacts have been separated the current supply from the lines 156 and 158 is broken to the load 166. To reestablish the circuit, it is necessary that the subscriber insert the required number of coins which will advance the ratchet wheel 90 and trip pin 88 thereon under the rock arm 84 causing the downward movement of the rock arm 86 and allowing the spring contact arm 120 to move downwardly and close the circuit through the contacts 128 and 130.

In the modified form of the invention shown in Figures 10 to 12, inclusive, the construction of the casing is identical to the form of the invention shown in Figures 1 to 9, inclusive, and comprises sections 170 and 172 which may be positioned against a wall or other supporting surface. The lower edge of the upper section 170 is provided with a grooved sealing member 174 and the upper casing section is extended downwardly as at 176 to protect and form a slide guideway for the lower section when the same is displaced.

A chassis is suspended from the upper section 170 and includes a pair of parallel supporting bars 178 having their upper ends rigidly attached to the upper casing section 170. A pair of lower chassis bars 180 are connected at right angles to the lower ends of the frame bars 178 and the free ends are connected to vertical standards 182. Horizontal frame bars 184 connect the vertical standards 182 to the chassis supporting bars 178.

Secured to the vertical standards 182 is a platform 186 having upstanding frame bars 188 arranged in spaced relation. Pivotally mounted between the frame bars 188 is a rock shaft 190 having an arm 192 to which one end of a coil spring 194 is secured. The opposite end of the coil spring is anchored to the platform 186. Also carried by the rock shaft 190 is a pair of oppositely extending arms 196 and 198 and the arm 198 is adapted to engage the curved free end of a movable contact member 200 anchored to an insulating block 202, as at 204.

A stationary contact arm 206 has its free end terminating short of the movable contact arm and the opposite end is connected to the insulating block 202 by means of a screw or the like 208. The insulating block 202 is supported on the upper end of a frame bar 210 carried by the platform 186.

A time controlled slide bar 212 is mounted for sliding movement on the upper ends of the upstanding bars 188 and is provided adjacent the ends thereof with elongated slots 214 in which are received guide bolts 216. A notch 218 is cut in one edge of the slide bar 212 and is adapted to register with the rock arm 198 when the slide bar is shifted by means of suitable clock mechanism engaging the pin 220.

The above mechanism operates to open and close contacts 222 and 224 carried by the contact arms 200 and 206 in substantially the same manner as the form of the invention shown in Figures 1 to 9, inclusive, and to hold the contacts in a closed position to prevent the current passing through the cables 226 and 228 from being interrupted, a coin controlled mechanism including a coin tube 230 having a slide 232 is provided in the upper casing section 170 and is substantially identical to the coin tube mechanism 30 shown in Figures 1 to 9, inclusive. The coin controlled mechanism is operable from a manual operating member located under the hinged cover 234 pivotally attached to the upper casing section as at 236.

A rock lever 238 has its upper end pivotally secured to the coin operated slide 232, as at 240, and the lower end of the rock lever is connected to a pin 242 carried by a suspended support 244 anchored to the lower chassis frame bar 180. An extension 246 is formed integral with the lower end of the rock lever and has its end provided with a pivoted pawl 248.

A rack bar 250 is slidably mounted in a tubular guide 252 supported between the lower chassis frame bars 180 by means of angle brackets 254 secured in place by bolts or the like. The extreme upper end of the rack bar 250 is adapted to engage the rock arm 196 and a pivoted pawl 258 is carried by the lower chassis frame section 180 by means of a support 260. The pawl 258 is presented to the rack bar 250 and is adapted to hold the same against downward movement when being advanced in a step-by-step manner by the pawl 248. Graduations 262 are provided on the rack bar opposite the rack teeth 264 which graduations correspond to those upon the dial 102 disclosed in Figures 1 to 9 inclusive.

Secured to one of the lower chassis frame bars 180 is a downwardly extending rod 266, the lower end of which is threaded for being received in a thread lock 267 carried by the floor of the casing section 172.

The operation of the invention shown in Figures 10 to 12, inclusive, is substantially identical to that shown in Figures 1 to 9, inclusive, with the exception that the coin controlled mechanism operates a rack bar 250 to engage the rock arm 196 instead of operating the ratchet wheel 199 to move the trip pin 88 under the rock arm 84. It will thus be obvious that the subscriber will be required to insert the designated number of coins to effect a corresponding number of rocking movements to the rock lever 238 with the resultant step-by-step advancement of the rack bar 250 to move the upper end 256 into engagement with the rock arm 196. In the event that the designated number of coins are not inserted, the slide bar 212 will move so that the notch 218 is in registry with the rock arm 196, thereby allowing the contact arm 200 to move upwardly and break the circuit through the cables 226 and 228.

The cables 226 and 228 may connect with a solenoid operated valve interposed in a supply line or they may interrupt the circuit through the electric current supply.

In the modified form of the invention shown in Figures 13 to 15, inclusive, the invention comprises a casing 270 on the inner wall of which is provided a pair of chassis frame bars 272 connected to parallel lower chassis bars 274 which extend to the opposite wall 276 of the casing and are connected to a coin chute 278 which is formed of fibroid or suitable insulating material. The wall 276 is offset from the wall 270 to form an opening 280 for receiving coins which slide downwardly between plates 282 and 284 spaced by end separators 286. Carried by one of the end separators 286 is a circuit closer including a contact member 288 anchored to a bushing 290 held in place by a machine screw 292. The free end of the contact 288 extends into the coin chute passage 278 and is adapted to engage a coin passing through the chute so that the coin will move the contact arm into engagement with a contact arm 294 supported by a bushing 296 anchored in place by a screw 298.

The contact 288 is connected to a solenoid 300 by a lead 302 while the opposite contact 294 is connected to the power line 306 by means of a lead line 304. A lead line 308 connects the other power line 310 to the solenoid 300 thereby completing a circuit through the solenoid upon the insertion of a coin in the slot 278.

An armature 312 is provided in the solenoid 300 and projects through a supporting strap 314 carried by the coin slot side bars 286. Mounted on the armature 312 is a disc-shaped cushion 316 for absorbing shocks during the movement of the armature and secured to the extreme free end of the armature is a collar 318 having an upstanding arm 320 extended inwardly, as at 322, the end of which terminates in a gear wheel engaging dog 324.

Also supported by the solenoid strap 314 is an oblique arm 326 to which is secured a tubular bushing 328 for rotatively receiving an arbor 330. On one end of the arbor there is provided a gear wheel 332, while the opposite end is adapted to receive a collar 334. Formed on the collar 334 is a pointer 336 adapted to cooperate with a scale 338 having peripheral graduations 340.

A dog 324 is presented to the gear wheel 332 and when it engages the teeth thereon, advances the wheel in a rotary manner. A pivoted detent 342 is also adapted to engage the teeth on the gear wheel 332 to prevent backward movement thereof and said detent is pivotally carried by an oblique arm 344 anchored on the arm 326 and is pivotally supported on a pin 346 around which is wound a coil spring 348, one end being anchored to the arm 344, while the other end engages the detent 342 to hold the same against the teeth of the gear wheel 332.

A trip pin 350 is secured to the gear wheel 332 and is adapted to engage a rock arm 352 carried by a rock shaft 354 rotatively mounted between vertical posts 356 mounted on a platform 358 securely fastened to the coin slot posts 286.

Extending oppositely from the rock arm 352 is a rock arm 360, also carried by the rock shaft and the free end thereof is adapted to engage a movable contact member 362 anchored to an insulating block 364. An arm 366 is secured to the rock shaft 354 and is provided with a coil spring 368 to normally urge the rock arm 360 upwardly.

Mounted on the insulating block 364 is a contact arm 370 directly under the contact arm 362 so that the respective contacts 372 and 374 will engage and close a circuit through respective lead lines 376 and 378.

One of the lead lines 376 is connected to the power line 306 while the other lead line 378 is connected to the electric meter 380.

A lead line 382 connects the other power line 310 with the meter 380 and lead lines 384 connect the meter 380 to the load 386.

The operation of the form of the invention shown in Figures 13 to 15, inclusive, is similar to the operation of the forms shown in Figures 1 to 12, inclusive, except that the gear wheel 332 is rotated by the impulses imposed on the solenoid 300 upon closing of the circuit therethrough by the insertion of a coin in the slot 280 which engages the movable contact 288 which moves the armature 312 and advances the gear wheel 332 a single notch.

Slidably mounted on the upper ends of the posts 356 is a slide bar 388 having a notch at one end for receiving the rock arm 360 when the slide bar 388 is moved by suitable clock mechanism (not shown) engaging a pin 390.

It will be readily understood that the utility company collector may set the pointer 336 with respect to the dial 338 in the same manner as is shown in Figures 1 to 9, inclusive, and that after a predetermined number of coins have been inserted in the coin chute 280, that the trip pin 350 will come to rest directly under the rock arm 352 and prevent its downward movement after the clock mechanism has shifted the slide bar 388 to bring the notch therein directly in alignment with the rock arm 360. Should the subscriber fail to insert the required number of coins, the clock mechanism will shift the slide bar 388 and allow the upward movement of the spring contact arm 362 thereby separating the contacts 372 and 374 with the resultant breaking of the circuit through the meter 380.

It is to be understood, that the forms of the invention herewith shown and described are to be taken as preferred embodiments thereof and that various changes in the shape, size and arrangement of parts may be resorted to without departing from the spirit of the invention or the scope of the subjoined claims.

What is claimed is:

1. A service terminator comprising a pair of normally closed cooperating electrical contact members, a rocker shaft having a pair of pins projecting therefrom, one of said pins being adapted to actuate one of the cooperating contacts for disengaging the same and opening a circuit, resilient means associated with the rocker shaft for affecting this movement, a coin set detent adapted to engage the other pin in a predetermined position to prevent rotation of the rocker shaft and the disengagement of the contact member, and a clock operated elongated latch bar having a notch therein which notch in a predetermined position of the latch bar receives the last named pin upon release by the detent to open the cooperating electrical contact member.

2. A service terminator comprising a pair of normally closed cooperating electrical contact members, a rocker shaft having a pair of oppositely disposed pins thereon, one of said pins being adapted to move one of the contacts for disengaging the same from its cooperating contact, resilient means associated with the rocker shaft normally tending to rotate the rocker shaft in a direction for the pin to disengage the contact, a coin set detent adapted to be moved into the path of the other pin in a predetermined position to prevent the rotation of the rocker shaft and the disengagement of the cooperating electrical contacts, and a clock operated elongated latch bar having an edge portion adapted to engage the first named pin and prevent the opening of the contact members after the detent has released the last named pin, said latch bar having a recess therein for receiving the first named pin to open the cooperating electrical contact members.

3. A service terminator comprising a pair of resilient normally closed cooperating electrical contact members, a rocker shaft having means thereon normally urging one of said contact members to an open position with respect to the other, a coin set detent adapted to engage means on the rocker shaft at a predetermined position of the coin set detent for preventing the opening of the contact members, and a latch bar actuated by a clock mechanism in predetermined positions of the latch bar cooperating with the first named means of the rocker shaft for preventing opening of the contact member and having a recess therein thereby upon the means being received in the recess permitting of the opening of the contacts by said means.

RULO WAYNE SMITH.